(No Model.)

G. D. ELGES.
CIGAR MACHINE.

No. 266,024. Patented Oct. 17, 1882.

Attest:
Charles Pickles
Albert G. Fish

Inventor:
G. D. Elges.
By Knight Bros
Attys.

UNITED STATES PATENT OFFICE.

GOTTLIEB D. ELGES, OF CLINTON, MISSOURI.

CIGAR-MACHINE.

SPECIFICATION forming part of Letters Patent No. 266,024, dated October 17, 1882.

Application filed July 26, 1882. (No model.)

*To all whom it may concern:*

Be it known that I, GOTTLIEB D. ELGES, of Clinton, in the county of Henry and State of Missouri, have invented a certain new and useful Improvement in Cigar-Machines, of which the following is a full, clear, and exact description, reference being had to the accompanying drawings, forming part of this specification, and in which—

Figure 1:
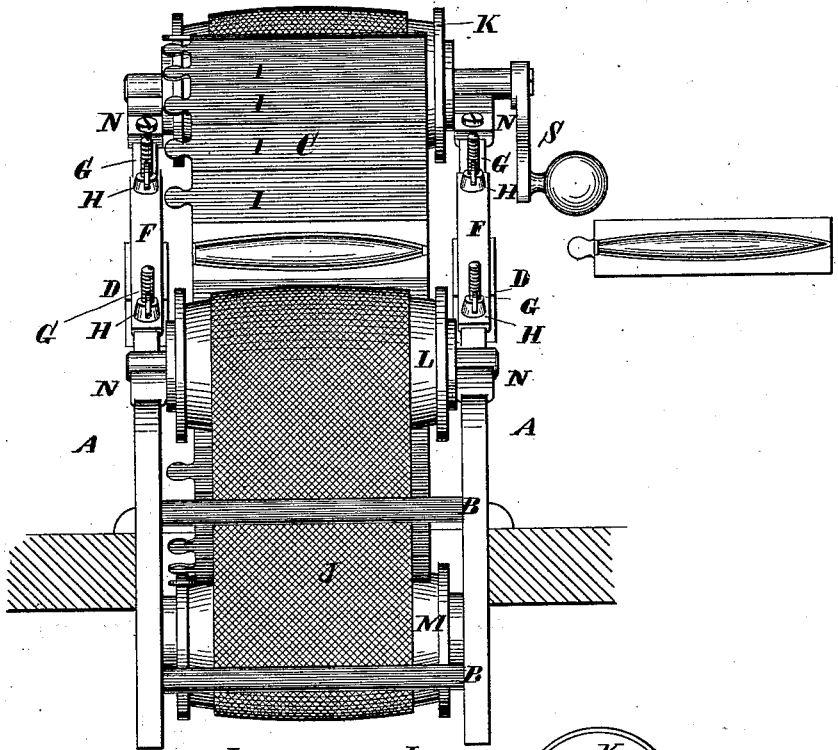
Figure 2:
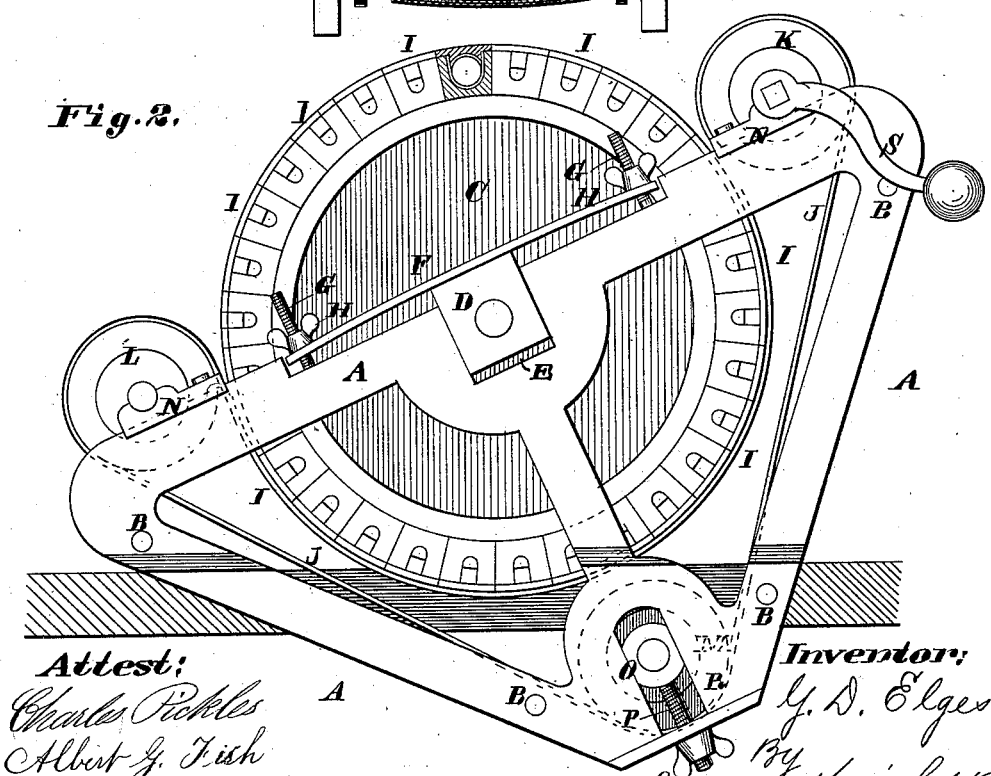

Figure 1 is a front view with the lid of one of the molds removed, and Fig. 2 is a side elevation of the apparatus.

My invention relates to a machine for pressing cigars; and it consists broadly in a drum or cylinder carrying cigar-molds on its periphery and revolving over an endless apron or belt which travels on rollers, as more fully set forth hereinafter.

A represents the frame of the machine, which I have shown resting on a table in an opening made to receive its lower end in the proper position for the use of the machine. The frame preferably consists of triangular side pieces connected by rods B.

C represents a drum or cylinder, which has suitable gudgeons journaled in blocks D, which fit and have vertical movement in openings E of the frame. These blocks are held from upward movement by spring-plates F and bolts G, with thumb-screws H, as shown.

To the periphery of the drum are secured molds I, of any well-known form. The drum is supported on an endless belt, J, which passes beneath it and over rollers K L and beneath a roller, M. The rollers K and L have gudgeons journaled on or in boxes N, secured to the frame by suitable means, and the roller M is preferably adjustably secured to the frame, so that by moving it up or down the belt may be tightened. I have shown the gudgeons of this roller M journaled in sliding boxes or blocks O, to the lower portions of which are secured screw-threaded bolts P, extending down through the lower end of the frame and having set-screws Q on their lower ends. The boxes O work in openings R of the frame.

It will thus be seen that by screwing up the nuts Q the roller M will be pulled down, which will tighten the belt up against the drum, so that any desired pressure upon the molds may be had.

The drum-boxes D may be rigidly secured to the frame; but I prefer to secure them as shown and described, because it gives a softer and better bearing between the drum and belt.

One of the three rollers over which the belt passes is provided with a crank, S, by the turning of which the belt is made to travel over its rollers, turning by friction the drum. I have shown this crank secured to the roller K as the most convenient of the three.

The operation of the machine is as follows: It is placed on a table in the position shown, and the operator then fills five or six molds, or any convenient number that is facing him, with tobacco. He then turns the crank, which revolves the drum, carrying the filled molds into the press and bringing up empty ones. When the molds that were filled first come up out of the press their lids are removed and the pressed cigars taken out and wrapped and laid to one side and the molds refilled, and so the operation goes on continuously.

I claim as my invention—

1. In a cigar-pressing machine, the combination of drum C, carrying molds I, rollers K, L, and M, and endless belt or apron J, the drum and rollers being journaled in suitable boxes secured to the frame, and the belt passing around the rollers and under the drum, all substantially as shown and described.

2. In a cigar-pressing machine, the combination of frame A, drum C, carrying molds I, and journaled in boxes secured to the frame, upper rollers, K L, journaled in boxes secured to the frame, lower roller, M, journaled in boxes O, sliding in openings in the frame, and adjustable by means of bolts P, secured to the boxes, and set-screws Q and endless belt J, all arranged and operating substantially as set forth.

3. In a cigar-press, the combination of frame A, drum C, carrying molds I, and journaled in boxes D, held from upward movement under pressure of the belt by spring-plates F, bolts G, and set-screws H, apron J, rollers K, journaled in boxes N, secured to the frame, and adjustable roller M, all arranged and operating substantially as shown and described.

GOTTLIEB D. ELGES.

Witnesses:
 GEO. H. KNIGHT,
 AUG. WEBER.